Oct. 11, 1938.  A. W. MUNSON  2,133,109

MOTION PICTURE FILM GUIDING APPARATUS

Filed July 28, 1936

INVENTOR.
ARTHUR W. MUNSON
BY
*W. E. Beatty*
ATTORNEY.

Patented Oct. 11, 1938

2,133,109

UNITED STATES PATENT OFFICE 2,133,109

MOTION PICTURE FILM GUIDING APPARATUS

Arthur W. Munson, Hollywood, Calif., assignor to Warner Bros. Pictures, Inc., New York, N. Y., a corporation of Delaware Application July 28, 1936, Serial No. 93,042

5 Claims. (Cl. 271—2.3)

This invention relates to the art of photography and has particular reference to apparatus for guiding a motion picture film through various film treating operations or stations.

After a negative or positive motion picture film has been exposed to an image of a scene it is general practice to pass the film through a series of successive treating operations in order to develop and fix the image thereon. Usually these operations are performed in tanks or compartments having spaced sets of film guiding spools therein around which the film is guided a number of times while passing through the various treating solutions and drying compartments.

Two types of film guiding arrangements are in common use at present. One type guides the film in a sinuous path over two or more spaced sets of film spools or rollers, the rollers in each set being placed one in back of the other having their axes parallel. This arrangement has the disadvantage that it takes up considerable space and also the film must be twisted 180° between each successive film spool to keep the emulsion side of the film always away from the surfaces of the spools.

The second type of film guiding arrangements guides the film in a helical or spiral path over two or more spaced sets of film spools, the spools in each set being placed co-axial with each other. Although this type is more conservative of space it has the disadvantage that the film engages the surface of each spool at an angle as measured transversely of the film and due to the transverse or side thrust thus created on the film, tends to scratch the smooth and relatively soft surface of the film engaging the periphery of the spool. Furthermore, if this angle between the edges of the film and the flanges on either side of the film spools becomes too great the edges of the film may be damaged.

An object of the present invention is to obviate the above-mentioned defects while guiding the greatest possible length of film through a given space.

This is accomplished by providing two spaced sets of film guiding spools, the axes of rotation of the spools in one of the sets being substantially at right angles to the axes of the spools of the other set. The spools are so arranged that the centers of the peripheries of one set of spools are directly in vertical alignment with the centers of the peripheries of the corresponding spools of the other set. Preferably each of the axes of the various spools is disposed at an angle of about 45° to the line between the points where the film enters and leaves the dryer.

Another object of the invention is to facilitate threading of a film over a series of closely spaced film guiding spools.

This is accomplished by providing a separate stub shaft for each film spool. The end faces of the adjacent spools are sufficiently separated to allow the film being threaded to be slipped sideways therebetween while in the form of a loop, and laid over the periphery of the spool.

More particularly describing the invention, reference is had to the accompanying drawing wherein.

Figure 1:
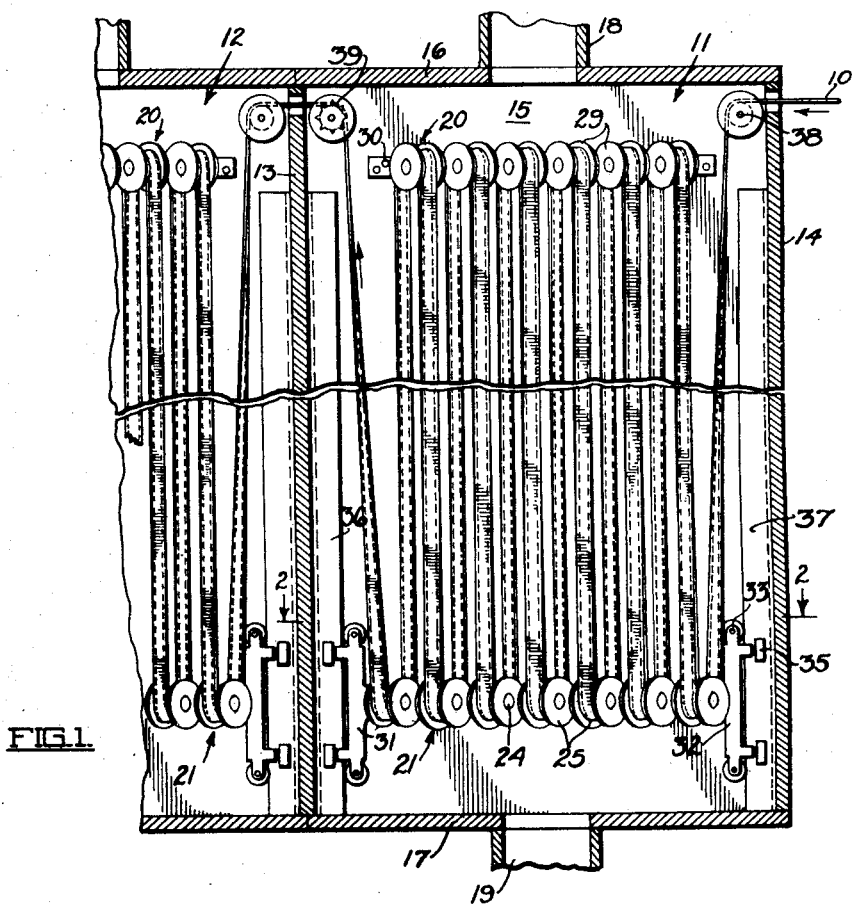
Fig. 1 illustrates a sectional elevational view of a film drying compartment embodying my invention.

Referring now to Fig. 1 the film 10, after being passed through the various treating solutions (not shown) is passed serially through a plurality of film drying compartments, two of which are shown at 11 and 12. Each of these compartments comprises vertical walls 13, 14, 15 and top and bottom walls 16 and 17, respectively. Conduits 18 and 19 open into the walls 16 and 17, respectively, to convey conditioned drying air upwardly through the various compartments 11, 12, etc., to absorb the moisture remaining on the surface of the film. Upper spool heads 20 and lower spool heads 21 are provided in spaced relation in each of the compartments around which the film is passed in a peculiar sinuous path.

Figure 2:
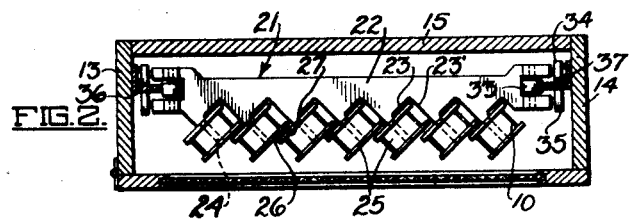
Fig. 2 is a plan sectional view through the drying compartment and is taken along the line 2—2 of Fig. 1.

Referring especially to Fig. 2, the lower spool head 21 comprises a spool carrying bar 22 having a series of stub shaft mountings or projections projecting from the front of the bar 22, these mountings or projections having a series of angularly cut faces 23 and 23', alternate ones of which are parallel and preferably angularly disposed at 45° to the length of the bar. Spool shafts 24 are secured in any suitable manner to the outer ends of each of the faces 23 extending in one direction and are directed normal to these faces. Film spools 25 are rotatably mounted upon the stub shafts 24, the distance between the adjacent overlapping end faces as at 26 and 27 being smaller than the width of the spools and these opposed end faces being spaced apart sufficiently to allow threading of the film on these various spools by sliding the film transversely or edgewise therebetween. This construction obviates the necessity of passing the leading end of the film between the surface of the spool over which the film is being threaded and the adjacent face 23' of the bar 22. It is to be noted that the outer ends of the shafts 24 are kept free and preferably terminate close to the outer end faces 26 of the spools 25 to facilitate the transverse or edgewise passing of the film between the spools for threading. By spacing the opposed ends of adjacent spools so close as to require edgewise film threading between adjacent spools, an economy of spool space is effected.

Figure 3:
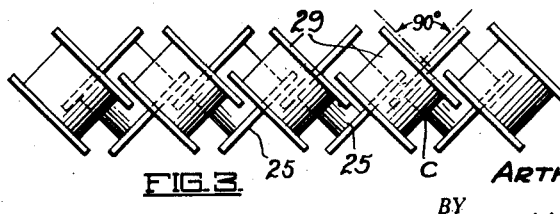
Fig. 3 is a diagrammatic view showing the arrangement of the upper and lower sets of spools in relation to each other.

The upper spool head 20 having a series of rotatable film spools 29 thereon is of essentially the same construction as that of 21, however, the axes of rotation of the spools 29 are at 90° to the axes of rotation of the spools 25 of the lower spool head 21. Upper spool head 20 is securely fastened as by bolts 30 to the rear wall 15. The size and spacing of the various film spools is such that the path of the film, as it passes from a lower spool 25 to an upper spool 29 is at right angles to the axes of rotation of those film spools as will be understood by reference to Fig. 3. The same is true of the film path between all sets of upper and lower spools. That is, the film as it passes from a lower spool 25 to an upper spool 29 travels in a vertical direction and, although it twists about an angle of 90° during its travel, the right angle relation abovedescribed results in the center of the periphery C of each upper spool 29 being directly in line with the center of the periphery of a corresponding lower spool 25. Thus the film does not produce a side thrust against the flanges of the various film spools as it passes thereover.

In order to compensate for shrinkage of the film as it passes through the compartments 11 and 12 and also to facilitate threading, the lower spool head is allowed to float, being supported by the lower film loops. This is accomplished by providing a pair of vertically extending projections 31 and 32 at either end of the lower spool bars 22. A set of three rollers 33, 34 and 35 is provided on each of the upper and lower ends of each of the trucks 31 and 32. These rollers engage one edge and both sides of vertical guide bars or tracks 36 and 37 secured to the side walls 13 and 14, respectively.

In threading, the lower spool head 21 may be raised by hand along the bars 36 and 37 to a point adjacent the upper spool head 20. The film 10 entering the compartment 11, passes over a freely rotatable guide roller 38 with its emulsion surface facing upward, away from the surface of roller 38. As it is passed downward to the first right hand spool of the lower spool head 21 it is twisted about 135° to keep the emulsion side away from the surface of the spool. In passing from a lower spool to an upper spool the film 10 twists about an angle of 90°, thus again keeping the emulsion surface thereof out of contact with the film spool surface. On completion of its path through the compartment 11, the film 10 passes over a sprocket 39 and thence into the next successive compartment 12. The sprocket 39 is driven by any suitable means (not shown) at a constant rate of speed.

Having thus described the invention, what is claimed as new and desired to secure by Letters Patent, is:

1. A film guiding apparatus comprising a film compartment, a pair of substantially parallel spool heads in said compartment, a set of parallel stub shafts carried by each of said heads, said shafts having their axes angularly disposed at substantially 45° to the lengths of said heads, the axes of the shafts on one of said heads being angularly disposed at substantially 90° to the axes of the shafts on the other of said heads, and film spools rotatably mounted on said shafts, the centers of the peripheries of the spools on one set of shafts being aligned with the centers of the peripheries of the corresponding spools on the other set of shafts to guide an elongate film in a sinuous path over said spools from one of said sets to the other without a transverse thrust while passing over said spools.

2. A film guiding apparatus according to claim 1 wherein the diameter of said spools and the spacing of said stub shafts on each of said spool heads is such that the distance between the opposed portions of the opposed ends of adjacent spools is so small as to require edgewise film threading between adjacent spools.

3. A film guiding apparatus comprising an upper horizontal spool head, and a floating lower horizontal movable spool head therefor adapted to be supported by loops of the film, each of said spool heads comprising an elongated body portion, a series of stub shafts, means on said body portion for supporting said shafts parallel to each other substantially at 45° to the length of said body portion in a horizontal plane and projecting from the front of said body portion, and spools for said shafts, whereby film may be threaded edgewise over said spools, the distance between the opposed portions of the adjacent ends of adjacent spools being smaller than the width of said spools; the centers of the peripheries of the spools on one of said spool heads being aligned with the centers of the peripheries of the corresponding spools on the other of said spool heads, with the axes of the spools on one of said heads disposed substantially at 90° to the axes of the spools on the other of said heads.

4. A film guiding apparatus according to claim 3 comprising a roller at each end of said lower spool head, and an upright track for each of said rollers.

5. A film guiding apparatus comprising an elongated spool head, a series of spaced projections extending laterally from said head, a stub shaft extending from each of said projections at 45° to the length of said head, all of said stub shafts lying in substantially the same plane, a film spool on each of said shafts, the distance between opposed portions of the adjacent ends of adjacent spools being smaller than the width of said spools.

ARTHUR W. MUNSON.